United States Patent [19]

Op den Camp

[11] 4,185,750

[45] Jan. 29, 1980

[54] RESERVOIRS FOR MASTER CYLINDERS

[75] Inventor: Lutz E. A. Op den Camp, Koblenz, Fed. Rep. of Germany

[73] Assignee: Girling Limited, Birmingham, England

[21] Appl. No.: 971,116

[22] Filed: Dec. 20, 1978

[30] Foreign Application Priority Data

Dec. 20, 1977 [GB] United Kingdom ............... 52867/77

[51] Int. Cl.² .................. B65D 1/24; B65D 85/00; F15B 7/10
[52] U.S. Cl. .................................. 220/20.5; 220/22; 137/576; 60/592
[58] Field of Search ............... 220/20, 20.5, 22, 85 B; 60/592, 589, 588, 585; 137/576

[56] References Cited

U.S. PATENT DOCUMENTS

| | | | |
|---|---|---|---|
| 3,914,943 | 10/1975 | Lewis | 60/585 |
| 3,989,056 | 11/1976 | Reinartz | 137/576 X |
| 4,127,210 | 11/1978 | Sabat | 60/588 X |

*Primary Examiner*—Steven M. Pollard
*Attorney, Agent, or Firm*—Scrivener, Parker, Scrivener & Clarke

[57] ABSTRACT

A reservoir of synthetic plastics material for a master cylinder is constructed from a base and a lid which are permanently connected together at their mating faces, for example by welding, along a join line which lies in a single plane. A partition is upstanding from the base and a passage defined by a wall and including a portion of the lid provides limited communication between chambers on opposite sides of the partition. At least one end of the passage lies outside at least one edge of the lid and the join line passes through the partition.

8 Claims, 1 Drawing Figure

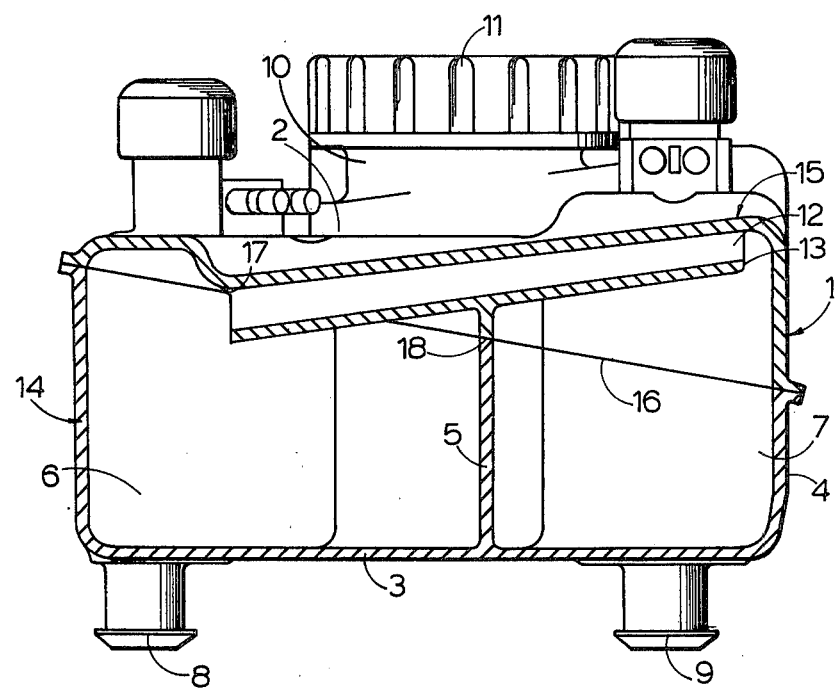

RESERVOIRS FOR MASTER CYLINDERS

SPECIFIC DESCRIPTION

This invention relates to improvements in reservoirs for master cylinders of the kind comprising a container of synthetic plastics material for hydraulic fluid, which is divided into two compartments by an upstanding partition, and restricted communication between the chambers on opposite sides of the partition is provided by a longitudinally extending passage which projects into each chamber by a substantial distance from the partition.

Containers of known reservoirs of the kind set forth are usually constructed from two parts comprising a body having an open-top, and a separate lid for closing the body and which is welded or otherwise permanently connected to the body at a join line comprising the mating faces of the two parts. In such known containers the partition can be formed integrally with one or both of the body parts, being permanently secured to the other part by simultaneous welding or other permanent connection between mating faces which lie on the join line between the body and the lid. Current practice requires that a separately moulded tube be inserted through the partition to form the longitudinally extending passage. This means that additional part and assembly costs are incurred and it is also very difficult to ensure that the tube is firmly fixed in a leak-proof manner to the partition. Once the body and the lid are welded together it is virtually impossible to check that the tube has been correctly assembled and fixed into the reservoir. Forming the longitudinally extending passage integrally with one of the container parts would involve extremely complicated moulding techniques and complex welding equipment. However it would be possible to form side and top walls of the passage integral with the container lid by present-day production moulding methods. The remaining floor or bottom wall of the passage would then have to be separately moulded and separately welded onto the lower edges of the wall portions integrally formed with the lid. Alternatively, two walls of the passage could be integrally moulded at right angles to the partition wall. Both methods would incur the cost and complexity penalties described above and furthermore, the sealing effect of such weld joints in the passage means could not be ensured.

According to our invention in a reservoir of the kind set forth for a master cylinder the container is constructed from two parts and the partition and a wall defining the passage are formed integrally with the two parts, the wall defining the passage being integrally formed wholly with one of the parts and that part being so constructed and arranged that the projected area of at least one end of the passage lies outside at least one edge of the container part with which it is integral, the mating faces of the two parts passing through the partition.

Arranging that at least one end of the passage is wholly exposed and unimpeded facilitates manufacture since mould or die parts or other tools can readily be removed after formation of that container part and, in consequence, the mould, die or other apparatus can be of relatively simple construction, because only one slider needs to be extracted before ejection from a cavity of a completely moulded part. The cycle time and unit cost is therefore decreased to a minimum.

Conveniently the mating faces of the two parts are permanently connected at a join line which lies in a single plane, and a point at one end of the wall which is closest to the said one container part with which the wall is integral lies on, or is spaced towards, the said one part with respect to the said single plane.

In such a construction the said single plane which passes through the partition may be inclined with respect to the axis of the passage.

Preferably the passage is located at or above the maximum fluid level in the reservoir and the said point at the said one end of the wall comprises the inner face of the said one container part itself.

In a preferred construction the single plane on which the join line lies passes through the side walls of the container parts.

One embodiment of our invention is illustrated in the single FIGURE of the accompanying drawing which is a longitudinal section through a reservoir for an hydraulic master cylinder for a vehicle braking system.

The reservoir illustrated in the drawing comprises a container 1 of synthetic plastics material having spaced substantially parallel top and bottom walls 2 and 3 which are interconnected by a continuous boundary wall 4. A partition 5 upstanding from the bottom wall 3 divides the container into front and rear chambers 6 and 7 and each chamber is provided with a respective outlet 8, 9 in the bottom wall 3 for connection to a pressure fluid intake in a tandem master cylinder, or other hydraulic connection.

A filler opening 10 in the top wall 2 which communicates directly with the chamber 7 is closed by a detachable screw-threaded closure cap 11, and the chamber 6 is filled with fluid from the chamber 7 through a passage 12. Excess fluid in the chamber 7 is drawn off when the system is finally bled.

The passage 12 is defined by a wall 13 which includes a portion of the top wall 2 and is integral with the partition 5 provides limited communication between the chambers 6 and 7 to restrict the transfer of hydraulic fluid between the chambers 6 and 7 in known manner under conditions of extreme vehicle acceleration and deceleration. The portion of the wall 2 which comprises a part of the wall 13 is inclined inwardly in a direction from the portion of the top wall 2 which defines the top of the chamber 7 to the portion of the top wall 2 which defines the top of the chamber 6. Thus the passage, which may be circular, or at least is of generally constant section throughout its axial length, is itself inclined with respect to the base 3. In the preferred embodiment illustrated in the drawings, the passage is of rectangular cross-section.

The container is constructed from two one-piece moulded parts, in addition to the closure cap 11. The two parts comprise a base 14 and a lid 15 which are permanently connected together at their mating faces, for example by welding, along a join line 16 which lies in a single plane. The said single plane is inclined both with respect to the axis of the passage 12 and the bottom wall 3 and the plane passes through a point 17 on the top wall 2 at the lower end of the passage 12 and an intermediate point 18 in the partition.

Arranging for the join line to lie in this plane ensures that the projected lower end of the passage 12 is completely exposed and lies outside the remainder of the lid 15. This facilitates manufacture since a mould slider which forms the integral section of the passage 12 can be readily removed easily after the wall 13 and a portion of the partition 5 above the join line 16 have been moulded integrally with the lid 15. Furthermore the passage 12 tapers slightly and increases in area in a direction towards the lower end of the passage, to facilitate withdrawal of the mould slider.

In use the axis of the passage 12 is substantially horizontal and lies along the main axis of the vehicle. The passage 12 itself is positioned above a small air bleed port in the partition and it is also located at or above the maximum fluid level in the reservoir.

In a further embodiment the passage 12 is parallel with the join line 16 and the projected areas at both ends of the passage 12 lie outside the join line of the two container parts.

I claim:

1. A reservoir for an hydraulic master cylinder comprising a container of synthetic plastics material for hydraulic fluid, an upstanding partition dividing said container into two chambers, and a wall defining a longitudinally extending passage for providing restricted communication between said chambers, said passage projecting into each said chamber by a substantial distance wherein said container is constructed from two parts and said partition and said wall are formed integrally with said two parts, said wall being integrally formed wholly with one of said parts and the said one part being so constructed and arranged that a projected area of at least one end of said passage lies outside at least one edge of the said one part with which it is integral, mating faces of said two parts passing through said partition.

2. A reservoir as claimed in claim 1, wherein said mating faces of said two parts are permanently connected at a join line which lies in a single plane, and a point at one end of said wall which is closest to the said one container part with which said wall is integral lies on, or is spaced towards, the said one part with respect to the said single plane.

3. A reservoir as claimed in claim 2, wherein said single plane which passes through said partition is inclined with respect to the axis of said passage, and one end of said passage lies outside one edge of the said one container part with which said wall is integral.

4. A reservoir as claimed in claim 3, wherein said passage tapers slightly and increases in area in a direction towards the said one edge.

5. A reservoir as claimed in claim 2, wherein the said single plane which passes through said partition is parallel to said axis of said passage, and the projected areas at both ends of said passage lie outside said join line of said two container parts.

6. A reservoir as claimed in claim 2, wherein the said single plane on which said join line lies passes through side walls of said container parts.

7. A reservoir as claimed in claim 2, wherein said passage is located at or above the maximum fluid level in said reservoir and the said point at the said one end of said wall comprises an inner face of the said one container part itself.

8. A reservoir as claimed in claim 1, wherein said reservoir comprises a base and a lid, and said wall defining said passage is integral with said lid.

* * * * *